(12) United States Patent
Bachrach

(10) Patent No.: US 6,532,190 B2
(45) Date of Patent: Mar. 11, 2003

(54) SEISMIC SENSOR ARRAY

(75) Inventor: Ran Bachrach, Okemos, MI (US)

(73) Assignee: Board of Trustees operating Michigan State University, East Lansing, MI (US)

( * ) Notice: Subject to any disclaimer, the term of this patent is extended or adjusted under 35 U.S.C. 154(b) by 79 days.

(21) Appl. No.: 09/732,131

(22) Filed: Dec. 7, 2000

(65) Prior Publication Data

US 2001/0030907 A1 Oct. 18, 2001

Related U.S. Application Data

(60) Provisional application No. 60/170,099, filed on Dec. 10, 1999.

(51) Int. Cl.$^7$ .............................. G01S 3/80; G01N 29/00
(52) U.S. Cl. ............................................. 367/25; 73/594
(58) Field of Search .............................. 367/25, 99, 96, 367/1, 13, 56; 73/594, 625, 628; 181/108

(56) References Cited

U.S. PATENT DOCUMENTS

| | | |
|---|---|---|
| 3,719,924 A | 3/1973 | Muir et al. |
| 3,921,755 A | 11/1975 | Thigpen |
| 4,001,768 A | 1/1977 | Fort et al. |
| 4,042,905 A | 8/1977 | Fort et al. |
| 4,059,820 A | 11/1977 | Turpening |
| 4,078,223 A | 3/1978 | Strange |
| 4,109,757 A | 8/1978 | Hebberd |
| 4,252,210 A | 2/1981 | Sodich |
| 4,374,378 A | 2/1983 | Lee |
| 4,455,631 A | 6/1984 | San Giovanni |
| 4,497,045 A | 1/1985 | Miller |
| 4,669,812 A | 6/1987 | Hoebing |
| 4,736,347 A | 4/1988 | Goldberg et al. |
| 4,849,947 A | 7/1989 | Baule et al. |
| 5,010,531 A | 4/1991 | McNeel |
| 5,111,399 A | 5/1992 | Armitage |
| 5,131,489 A | 7/1992 | Hackett |
| 5,214,614 A | 5/1993 | Baule |
| 5,231,251 A | 7/1993 | Hackett |
| 5,231,252 A | 7/1993 | Sansone |
| 5,285,423 A | 2/1994 | Zachariadis et al. |
| 5,317,383 A | 5/1994 | Berni |
| 5,327,216 A | 7/1994 | Berni |
| 5,335,208 A | 8/1994 | Sansone |
| 5,390,155 A | 2/1995 | Lea |
| 5,822,269 A | 10/1998 | Allen |
| 5,917,160 A | 6/1999 | Bailey |
| 5,963,879 A | 10/1999 | Woodward et al. |
| 5,971,095 A | 10/1999 | Ozbek |
| 6,002,640 A | 12/1999 | Harmon |
| 6,049,508 A | 4/2000 | Deflandre |
| 6,055,214 A * | 4/2000 | Wilk ............................ 367/99 |
| 6,075,752 A | 6/2000 | de Bazelaire |

FOREIGN PATENT DOCUMENTS

| | | |
|---|---|---|
| EP | 0 317 052 A2 | 5/1989 |
| WO | WO 91/10923 | 7/1991 |
| WO | WO 99/51995 | 10/1999 |

OTHER PUBLICATIONS

"Toward the autojuggie: Planting 72 geophones in 2 sec" by Don W. Steeples, G.S. Baker and C. Schmeissner at Department of Geology, The University of Kansas, Lawrence, Kansas, printed in Geophysical Research Letters, vol. 26, No. 8, pp. 1085–1088, Apr. 15, 1999.

* cited by examiner

Primary Examiner—Gregory J. Toatley, Jr.
(74) Attorney, Agent, or Firm—Harness, Dickey & Pierce, P.L.C.

(57) ABSTRACT

The preferred embodiment of a seismic sensor array includes a sheet of material and seismic sensors mounted to the sheet. In a further aspect of the present invention, the array includes devices to make the seismic sensor array portable and transportable. In another aspect of the present invention, the seismic sensor array is part of a seismic measurement recording system which includes a data collection box and a computer.

24 Claims, 8 Drawing Sheets

SEISMIC SENSOR ARRAY

CROSS REFERENCE TO RELATED APPLICATIONS

This application claims priority to U.S. provisional patent application Serial No. 60/170,099, filed on Dec. 10, 1999, which is incorporated by reference herein.

BACKGROUND OF THE INVENTION

This invention relates generally to geological measuring devices and more specifically to seismic measurements using arrays.

In many geological applications, including drilling and prospecting, seismic operations are frequently performed to generate and collect information indicative of the physical properties of subsurface formations. In addition, in many construction, drilling, and excavation applications, the knowledge of what is under the ground is necessary to avoid water mains, gas and electrical lines, foundations, and the like. A conventional seismic land operation includes placing a seismic cable along the surface of the earth. Usually, the cable extends in a straight line and contains many wire pairs. Seismic acquisition on land has in the past utilized a plurality of geophone arrays strung together by wire for the purpose of electrical communication to a multichannel recording unit. Individual geophone arrays normally consist of a plurality of geophones that are planted in survey lines spaced groupings of 12 to 24 geophones over distances of 55 to 440 feet by unskilled operators who often have little regard for proper orientation of the geophones.

In an attempt to improve data quality, three-dimensional geophones have been used to measure motion in three orthogonal directions. Each three-dimensional geophone typically includes three separate unidirectional geophones that are oriented for three-dimensional pickup and housed in a single enclosure, as typified by the geophone described in U.S. Pat. No. 5,010,221 entitled "Three Dimensional Geophone" which issued to McNeel on Apr. 23, 1991, and is incorporated by reference herein. These devices are disadvantageous in that they are difficult to repair and require strict horizontal placement.

In a typical seismic survey for a large geographical area, the area is traditionally covered by a plurality of survey lines. Seismic profiles are then recorded along each of the survey lines. The survey line is taken out after the profile is recorded and a new survey line is set up for recording the new profile. For the application of collecting data for three-dimensional imaging of the subsurface, it is necessary to record profiles from many survey lines in different positions.

On land, a seismic cable, typically approximately two miles in length and formed from a series of identical sections, is laid on the ground along a survey line. There is connected a two-wire conduit to electrically interconnect at each takeout or branch, for example, about thirty geophones into a single group or array. Each geophone group is located in the general vicinity of the takeout of the seismic cable to which it is attached.

A sensor platform has been used before in which sensors are mounted directly to a rigid horizontal frame described in U.S. Pat. No. 5,221,122 entitled "Sensor Platform for Use in Seismic Reflection Surveys" which issued to Sansone on Jul. 27, 1963, and is incorporated by reference herein. This device is intended for use in marine and fast moving river applications.

Furthermore, in the past, software and other methods used to calculate the seismic data have been designed for operators who have extensive training in interpretation of such data. These methods suffer from the time and energy of placing sensors in survey lines. These methods have the inherent problems of if the line is not place correctly, it will affect the quality of the data acquisition. It takes operators with a great deal of training to properly set survey lines to collect three-dimensional data. In addition, each time a survey line is disassembled, there is a great deal of wear and tear that the sensors experience, thus leading to a shorter lifetime of these sensors. Moreover, the collection of data using these methods requires a highly trained specialist to interpret the data in order to generate three-dimensional images.

SUMMARY OF THE INVENTION

In accordance with the present invention, the preferred embodiment of a seismic sensor array includes a sheet of material and seismic sensors mounted to the sheet. In a further aspect of the present invention, the array includes devices, such as a rigid frame, vehicle mount or trailer, to make the seismic sensor array portable and transportable. In another aspect of the present invention, the seismic sensor array is part of a seismic measurement recording system which includes a data collection box and a computer. The computer includes software that produces three-dimensional images of seismic data that is collected in real time. A method of use of the present invention includes the positioning of the array, and collecting and processing data.

The seismic sensor array of the present invention is advantageous over the conventional devices in that the present invention array is lightweight, portable, and can be used in many different environments. The array keeps the sensors fixed and consistent allowing for a real time data processing system to be built. The data processing system reduces set up and processing time thus allowing the collected data to be viewed in a three-dimensional format in a matter of seconds. The present invention is also operable by operators with minimal training. Furthermore, contractors, excavators, utility repair teams, environmental consultants, and geologist can use the present invention a minimal amount of training. Additionally, in the present invention, the seismic sensors are mounted to a sheet of material that is easily moveable and eliminates additional wear and tear on the sensors from being taken out of ground after each survey line is disassembled. Additional advantages and features of the present invention will become apparent from the following description and the appended claims, taken in conjunction with the accompanying drawings.

DETAILED DESCRIPTION OF THE PREFERRED EMBODIMENTS

Figure 1:
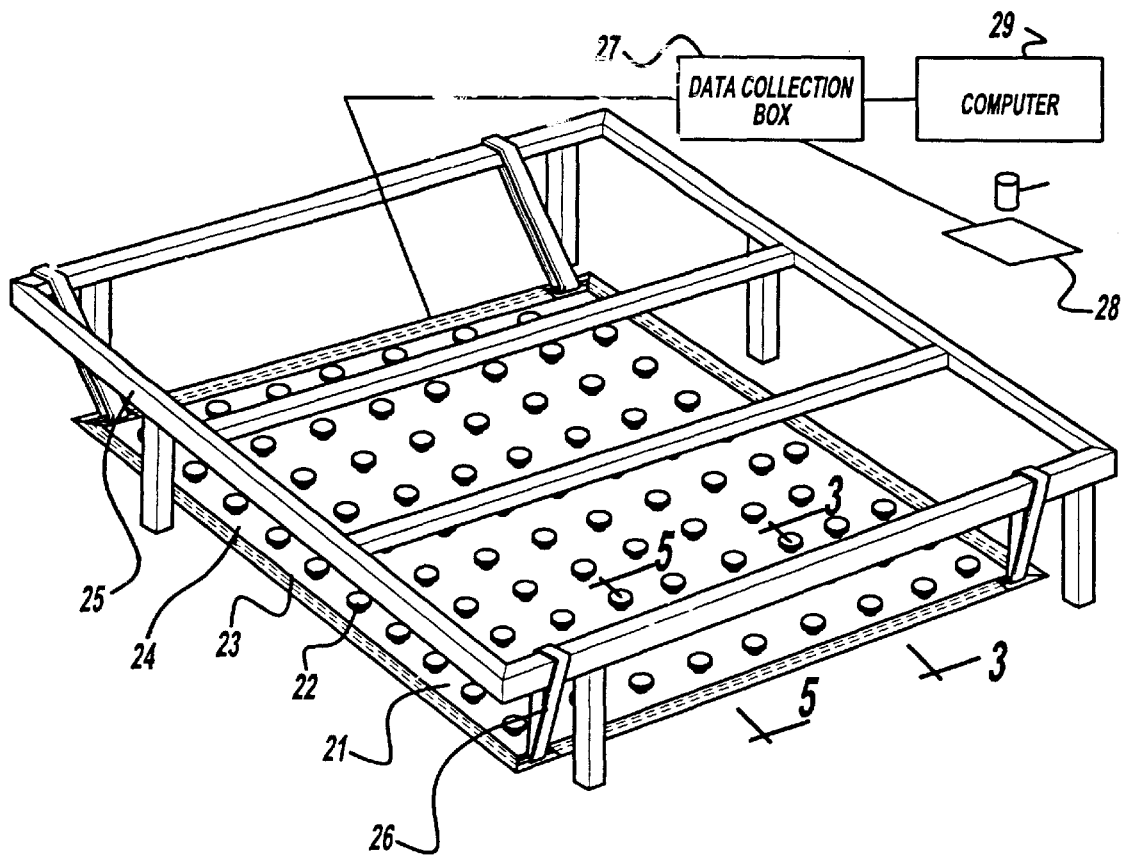
FIG. 1 is a perspective view showing the first preferred embodiment of a seismic sensor array of the present invention.
Figure 2:
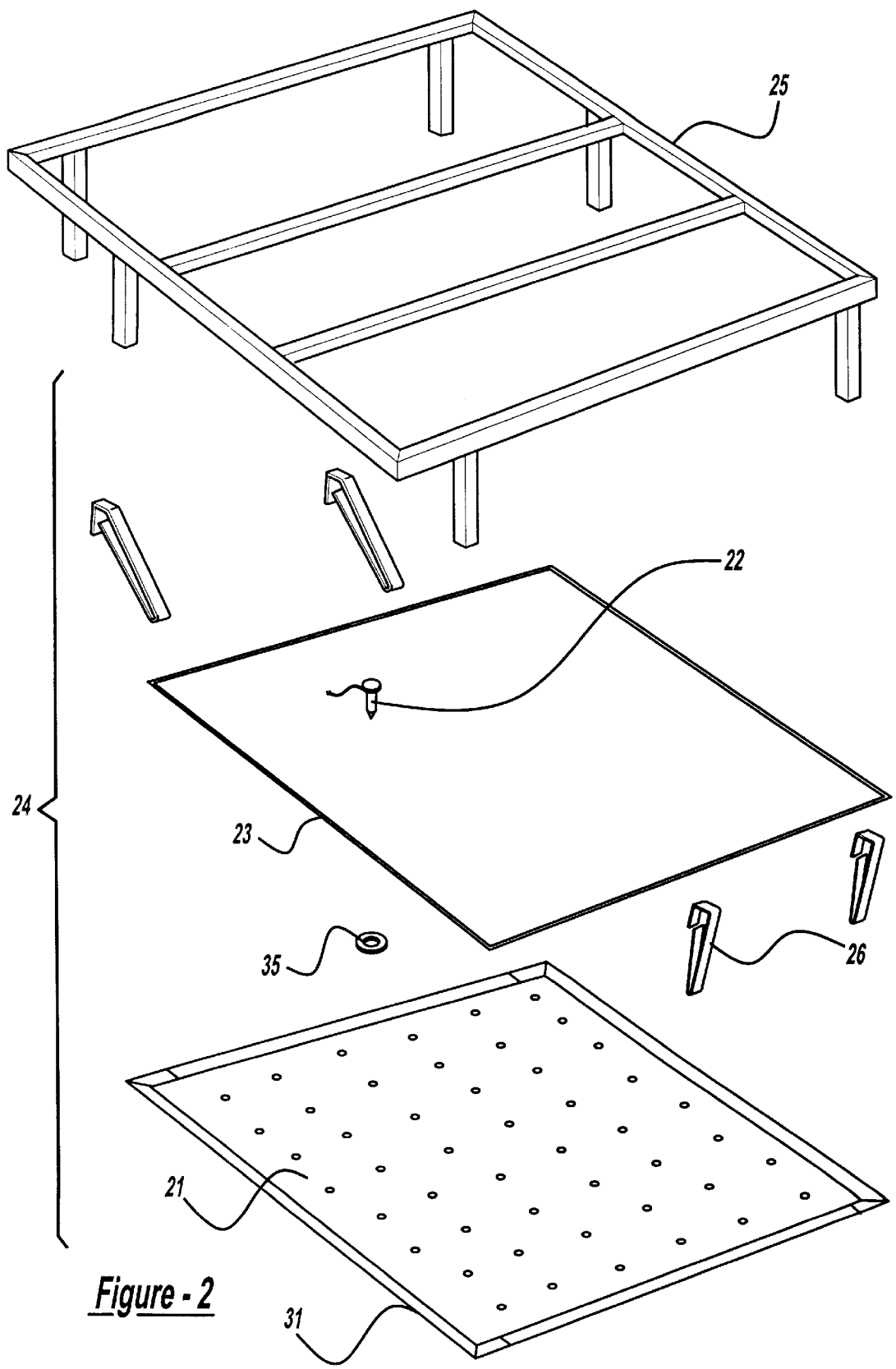
FIG. 2 is an exploded perspective view showing the first preferred embodiment of the seismic sensor array.

Referring to FIGS. 1, 2, 3a, and 5 the first preferred embodiment of a seismic sensor array 24 of the present invention includes a flexible sheet of reinforced polymeric material 21 and a first carrying frame 23. Multiple seismic sensors 22 are mounted to sheet 21. Frame 25 acts as a handle to make it easy for operators to manually lift and move seismic array 24. Carrying frame 25 is generally rigid and attached to seismic sensor array 24 by four straps 26. Frame 25 is preferably made of hollow aluminum members but may alternatively be made of other metals, polymers, wood, alloys, fiberglass, or other materials. In an alternative variation, it is envisioned that other frame configurations or supplemental handle attachments can be used, and the carrying frame can also be foldable. Straps 26 are made of one-inch wide nylon but may alternatively be cloth, polymeric, elastic, or other suitable material for the application.

A set of grommets 35 are attached to sheet 21. Each seismic sensor 22 is mounted to sheet 21 through the corresponding grommet 35. Grommet 35 is preferably metal, but may alternatively be polymeric, rubber, or other materials. Grommet 35 may also be manufactured as an integral piece of sheet 21 or substituted by other reinforcements for the holes in sheet 21. Sheet 21 is attached to a sub-frame 23. Sub-frame 23 is preferably made of aluminum that is hollow but may alternatively be made of other metals, polymers, wood, alloys, fiberglass, or other materials. At the end of sheet 21, a pocket 31 is formed around sub-frame 23, thus attaching sheet 21 to sub-frame 23. The end of sheet 21 is folded over and fastened to itself by stitching, adhesive bonding, stapling, heat sealing, sonic welding, snapping, use of hook and loop fasteners, or the like, to form pocket 31.

Each seismic sensor 22 is preferably a two-dimensional geophone, which can be obtained from Mark Products as Part No. L-40. A three-dimensional geophone, piezo-electric sensor, velocity sensor, accelerometer-type sensor, hydrophone, or other type of sensor suitable for seismic measurements can alternately be used. Each seismic sensor 22 includes a spike-like member for use in ground 34 applications, such as dirt, sand, grass, and the like. Attached to a disc-like head of each seismic sensor 22 is a wire 33 that connects the seismic sensor to other seismic sensors and to a data collection box 27. Wire 33 is separate from sheet 21 but, alternatively, may be attached to the flexible sheet 21 or manufactured as a part of the flexible sheet 21. In another alternate variation, it is envisioned that wire 33 is replaced by a wireless system, such as, infrared, radio waves, microwave, digital frequency, or the like, employing transmitters and receivers that connects together seismic sensors 22 and data collection box 27.

Figure 10:
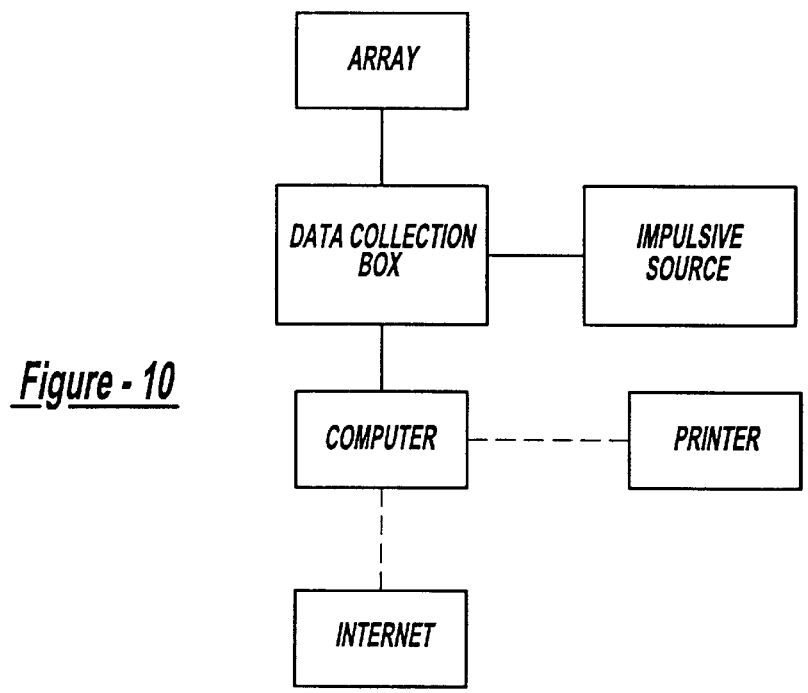
FIG. 10 is a block diagram of a control system employed in the first preferred embodiment of the seismic sensor array.

Data collection box 27, which can be obtained from Geometrics StrataVisor NZ, is electrically connected to the seismic sensor array 24. Also connected to data collection box 27 is an impulse source 28, such as a hammer mechanically striking a plate, a pneumatic hammer or a hydraulic hammer. This connection activates data collection box 28 to start collecting sensed data. Data collection box 27 is also electrically connected to a microprocessor-based computer 29 with software which can create three-dimensional images of the collected data. Computer 29 is preferably a Dell brand 700 mHz laptop, personal computer. FIG. 10 show a block diagram of the electrical connections of the preferred embodiment electronic control system. The computer may also be connected to a printer and a network of remotely located computers such as the Internet. In another alternate variation, it is envisioned that the electrical connections between array 24, data collection box 27, impulse source 28 and computer 29 are replaced by a wireless system, such as, infrared, radio waves, microwave, digital frequency, or any other application wireless system. Furthermore, fiber optic connections can be substituted for the wires. It is also envisioned that data collection box 27 can be built directly into computer 29.

Figure 3A:
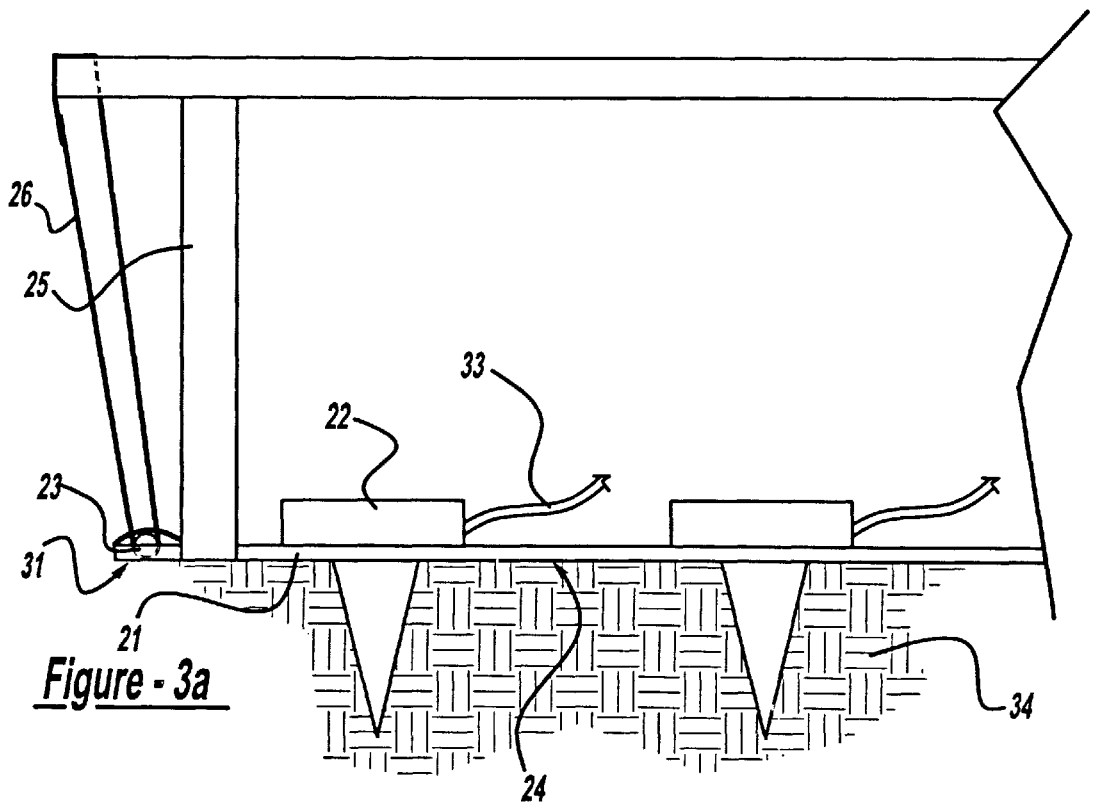
FIG. 3a is a cross sectional view, taken along line 3—3 of FIG. 1, showing the first preferred embodiment of the seismic sensor array.
Figure 3B:
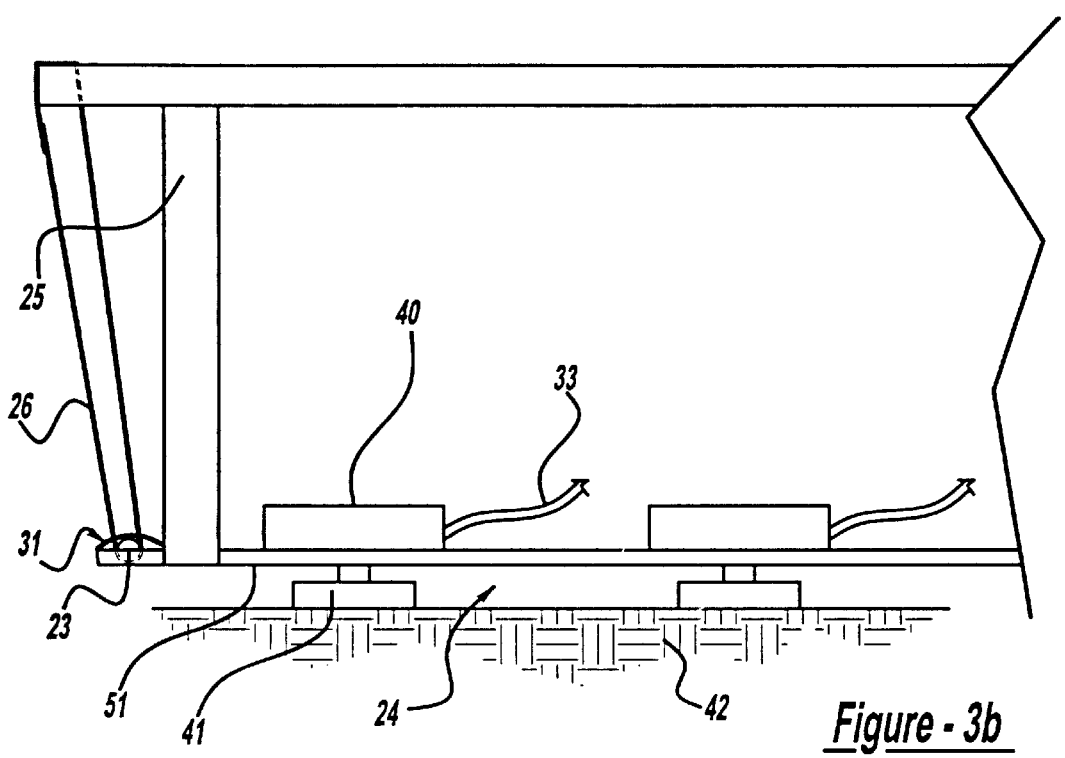
FIG. 3b is a cross sectional view, taken along line 3—3 of FIG. 1, showing the second preferred embodiment of the seismic sensor array.

FIG. 3b shows a second preferred embodiment of the present invention of seismic sensor array 24. In this embodiment, each seismic sensor 40 includes a plate-like member 41 for use against hard-surface 42 applications, such as cement, asphalt, highways, and the like. Plate-like member 41 is made out of materials with the exact acoustical impedance as that of hard surface 42 that plate-like member 41 is in contact with. For example, there is a predetermined plate-like member for concrete and a different one for asphalt.

Figure 4:
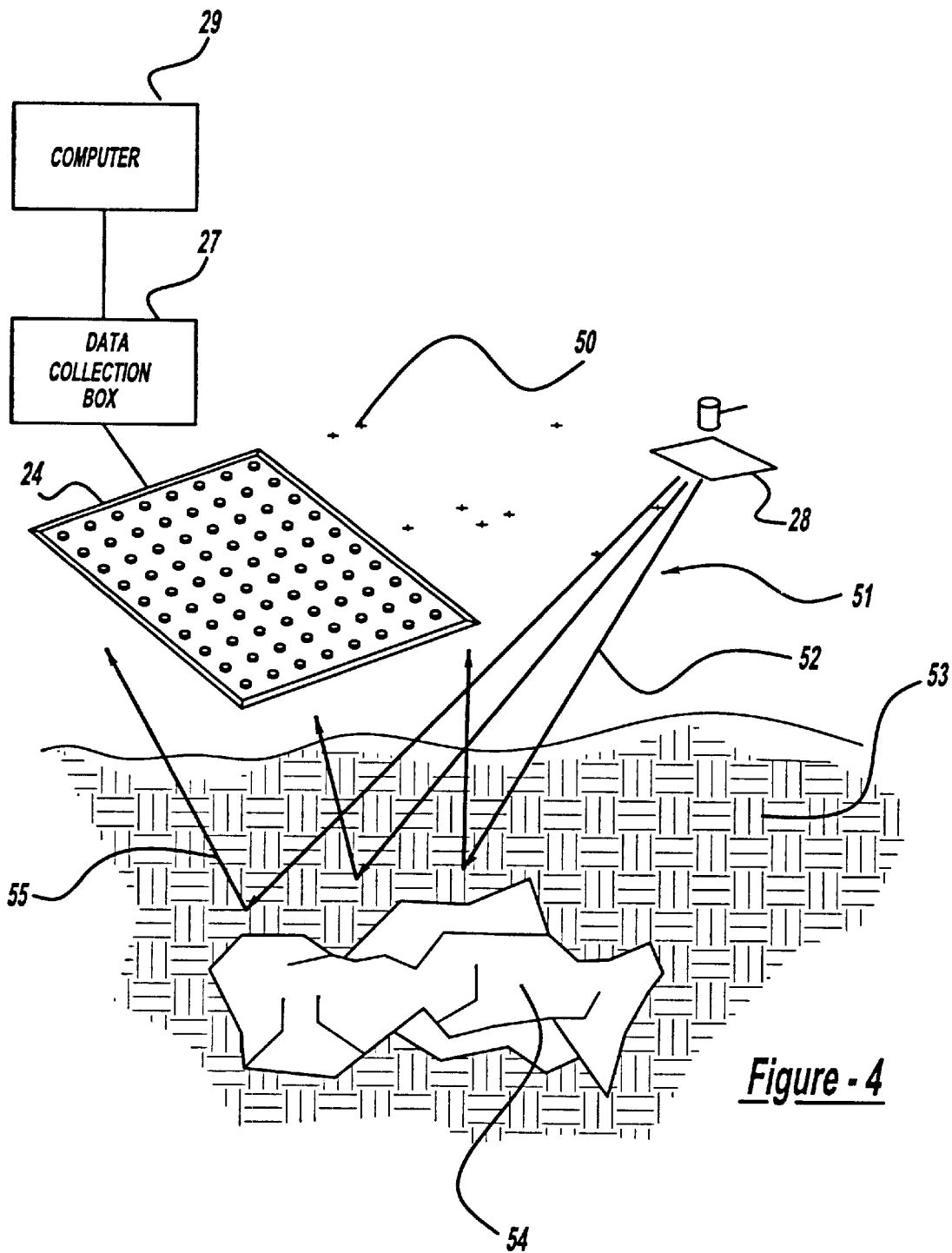
FIG. 4 is a diagrammatic view showing the first preferred embodiment seismic sensor array in use.
Figure 5:
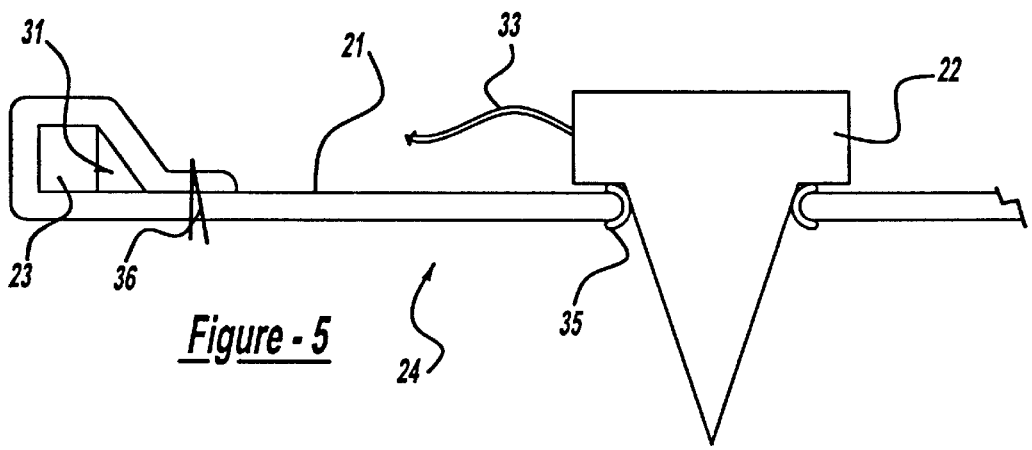
FIG. 5 is a cross sectional view, taken along line 5—5 of FIG. 1, showing the first preferred embodiment of the seismic sensor array.

FIG. 4 is an illustration of the first preferred embodiment of seismic sensor array 24 in use. Array 24 is placed on ground 51. Impulse source 28 is used to generate and transmit a signal 52 through the ground or substrate 53. A back-scattered signal 55 is reflected from a sub-surface target area 54 and is then received by sensors 22 in array 24. The received signal is then transmitted from sensors 22 and collected in the electronics of data collection box 27. The data is transferred from data collection box 27 to the microprocessor of computer 29. A few more data sets are collected by moving impulse source 28 to other locations on ground 50 and repeating the process of transmitting and receiving signals through a similar process. These several sets of data are collected and transferred to computer 29 were they are combined and three-dimensional images are created of the substrate complete with details of target area 54. Target area 54 can be a pipe, utility line, foundation, geological formation, or the like. Using this process to identify target area 54 is known as dynamic focusing.

This array system is used at depths from 0.5 meters to 50 meters, which are sometimes known as ultra shallow depths. Taking seismic information at these depths is possible because of the density of sensors 22 on array 24. Sensors 22 are spaced 0.25 meters apart in the first preferred embodiment and this increases the signal-to-noise ratio. Array 24 also is designed to use higher frequencies, thus increasing resolution. The signals used are between 100 and 800 Hz. It is envisioned that the array can be used over a wider range of frequencies that correspond with different sensors 22. The array system provides a large fold for off sets, the fold being the number of reflections for a given sub-surface point, thereby enabling the emission of high frequency reflection and minimizing the distance the wave is traveling. This preserves the high frequencies generated from impulse sources 28 while further improving the filtering and any coherent noise due to the coverage of array 24. A high signal-to-noise ratio improves the resolution of faint reflections.

Figure 12:
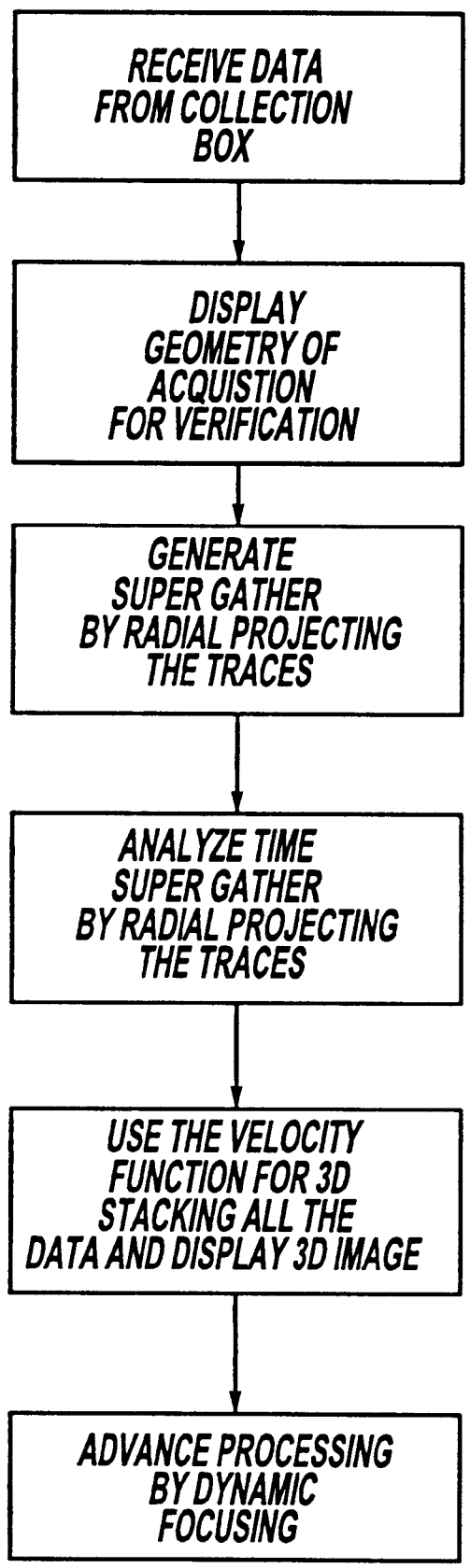
FIG. 12 is a flow diagram of software employed in the first preferred embodiment of the seismic sensor array.

The software used to generate the three-dimensional images is laid out in a flow chart of FIG. 12. The four basic steps to the processing sequence re: 1) bandpass filtering of the data with a window of 300 Hz to 3000 Hz; 2) muting the first arriving signals; 3) Normal Movement (NMO) correction of the data; 4) binning of the data and stacking same. A more detailed description of the process is as follows: the data is received from data collection box 27; band pass filtering of the data and muting of the first arriving signals is done on the data collection box; and the data that is received from data collection box 27 by computer 29 then displays the geometry of the acquisition data to verify that the data was indeed captured. The software generates "supergather" of the data by radially projecting the traces and then analyzing the time supergather; this includes velocity analysis on the supergather and obtaining velocity information and the function needed for imaging. The velocity function is used for three-dimensional stacking of all the data and displaying the three-dimensional image. This includes using the velocity function for three-dimensional imaging by NMO correction and stacking. Advance processing add-ons to this include using stack depth migration for advanced imaging, dynamic focusing, and property estimation by rock physics using AVO. In the preferred embodiment, the three-dimensional image is displayed on the computer in less than two minutes after data acquisition. It is envisioned that as computer power increases and the software is improved, the three-dimensional display of the data will be in real time.

Figure 6:
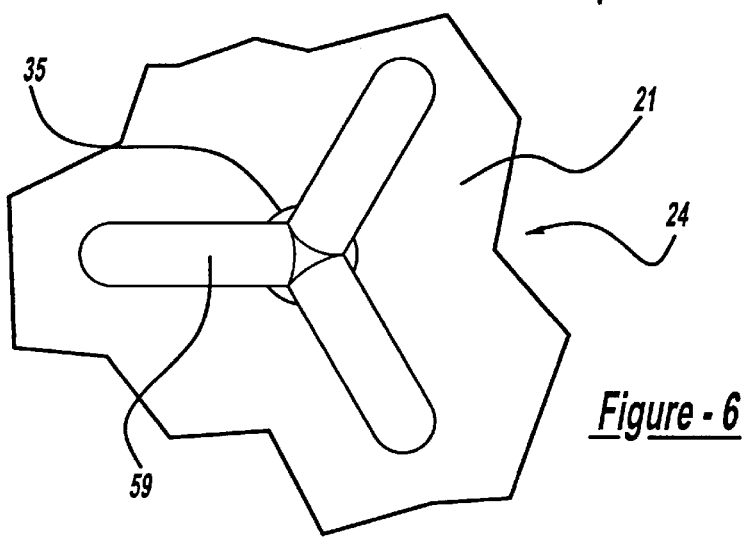
FIG. 6 is a top elevational view showing a first alternative embodiment of the seismic sensor array of the present invention employing a three-dimensional geophone sensor.

Referring to FIG. 6, seismic sensor array 24 employs an alternative seismic sensor 59. Sensor 59 is a three-dimensional geophone. Sensor 59 is mounted through a grommet 35 which is affixed to sheet 21. Two-dimensional geophones primarily collect pressure waves which provide information about density and pressure wave velocity of the sub-surface. In any engineering applications there is a need to also obtain information about shear strength of the sub-surface. Three-dimensional geophone 59, which are a set of three unidirectional orthogonal geophones housed in a single enclosure, enables the simultaneous collection of the density, pressure wave velocity, and the shear wave data.

Figure 7:
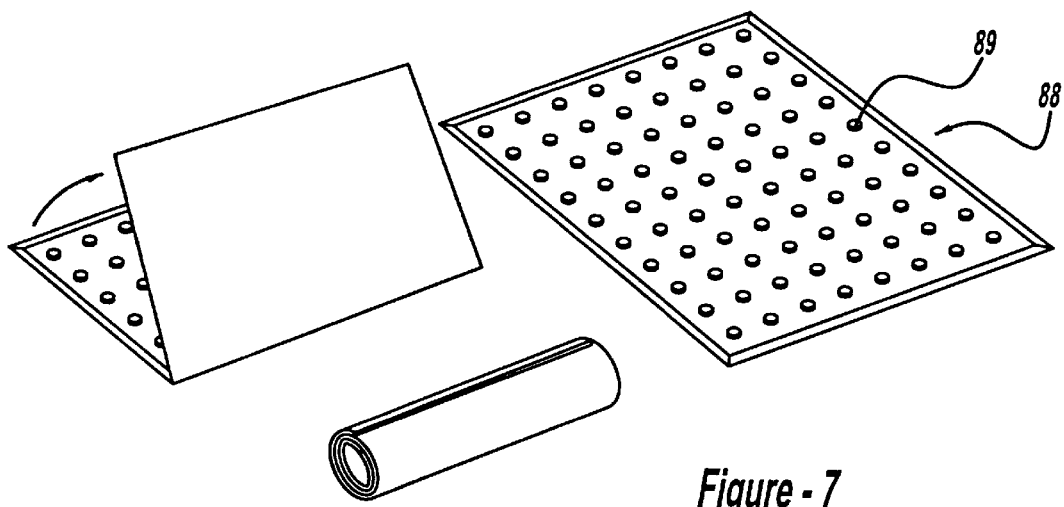
FIG. 7 is a perspective view of the third preferred embodiment of the seismic sensor array.

FIG. 7 illustrates a third preferred embodiment of a seismic sensor array 88. This embodiment provides a flexible sheet and geophone sensors like that in the first preferred embodiment of seismic sensor array, except this embodiment has 72 seismic sensors 89 in the array. Moreover, this seismic sensor array 88 can be easily folded or rolled up for packing and transporting since no rigid frame is used if rolled, or one with intermediate hinges can be employed if folded.

Figure 8:
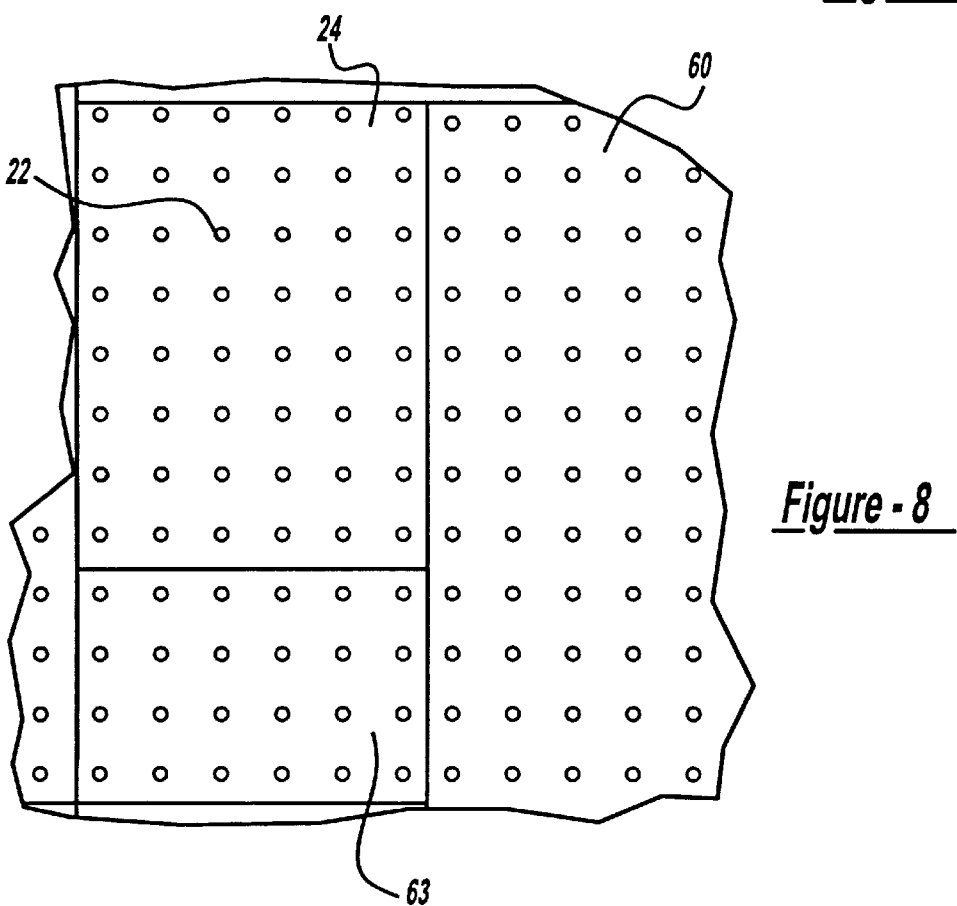
FIG. 8 is a top elevational view showing a second alternate embodiment of the present invention employing a plurality of individual arrays.

FIG. 8 is an illustration of a second alternate embodiment of a seismic sensor array having multiple sub-arrays 24, 60 and 63. Each sub-array has a different number of seismic sensors 22 in the array. Sub-arrays 60 and 63 have twenty-four or less seismic sensors 22, or can have up to two hundred forty-four or more seismic sensors 22 in the sub-array. Any quantity between the twenty-four and two hundred forty-four is a possible number of sensors 22 that can be used in a sub-array. The seismic sensor sub-arrays 24, 60 and 63 are positioned next to one another and configured to cover a ground surface that has any shape. Up to four sub-arrays can be connected to data collection box 28 (see FIG. 10) for simultaneous data collection and it is envisioned that more than four arrays can be connected to the data collection box.

Figure 9:
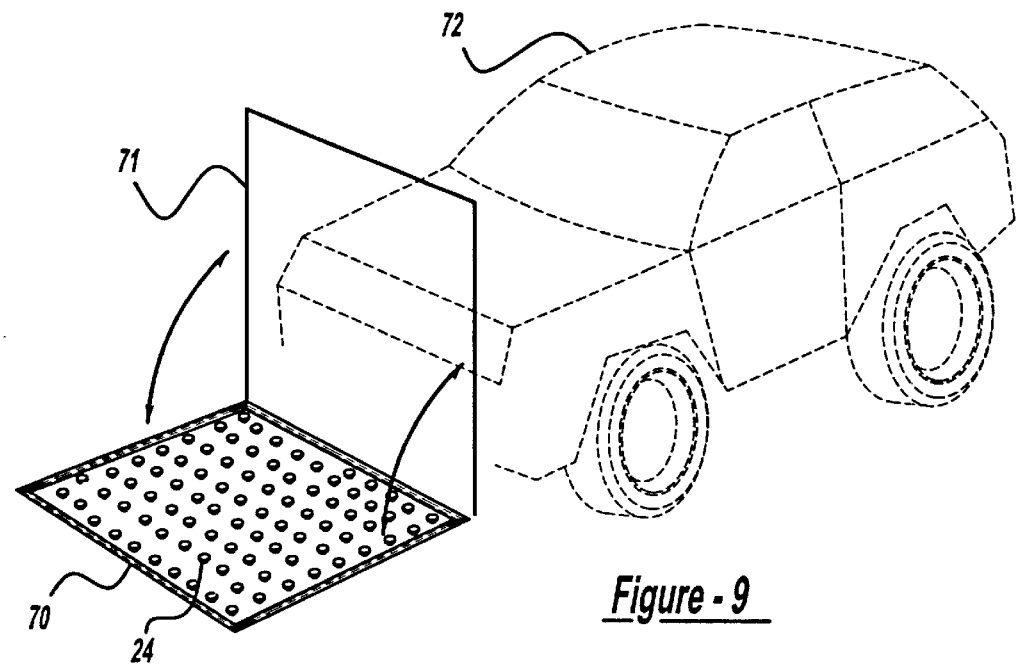
FIG. 9 is a diagrammatic view showing a third alternate embodiment seismic sensor array of the present invention, mounted to a vehicle.

With reference to FIG. 9, a third alternative embodiment of seismic sensor array 24, such as the type described in the first preferred embodiment, is mounted on a motorized vehicle 72. Vehicle 72 is a truck, sport utility vehicle, heavy-duty truck, tractor, bulldozer, tank, snowmobile, all terrain vehicle, or the like. Array 24 is movable from a substantially vertical, retracted and transportable position 71 to a substantially horizontal, measurement position 70 in which the sensors of the array 24 are touching the ground. A hinge or other linkage in the frame, driven by an actuator, allows movement of the array 24 from the transportable position to the measurement position and back again. The actuator used for the movement of the array 24 is an electric motor, hand operated mechanical device, pneumatic piston, hydraulic piston, or the like.

Figure 11:
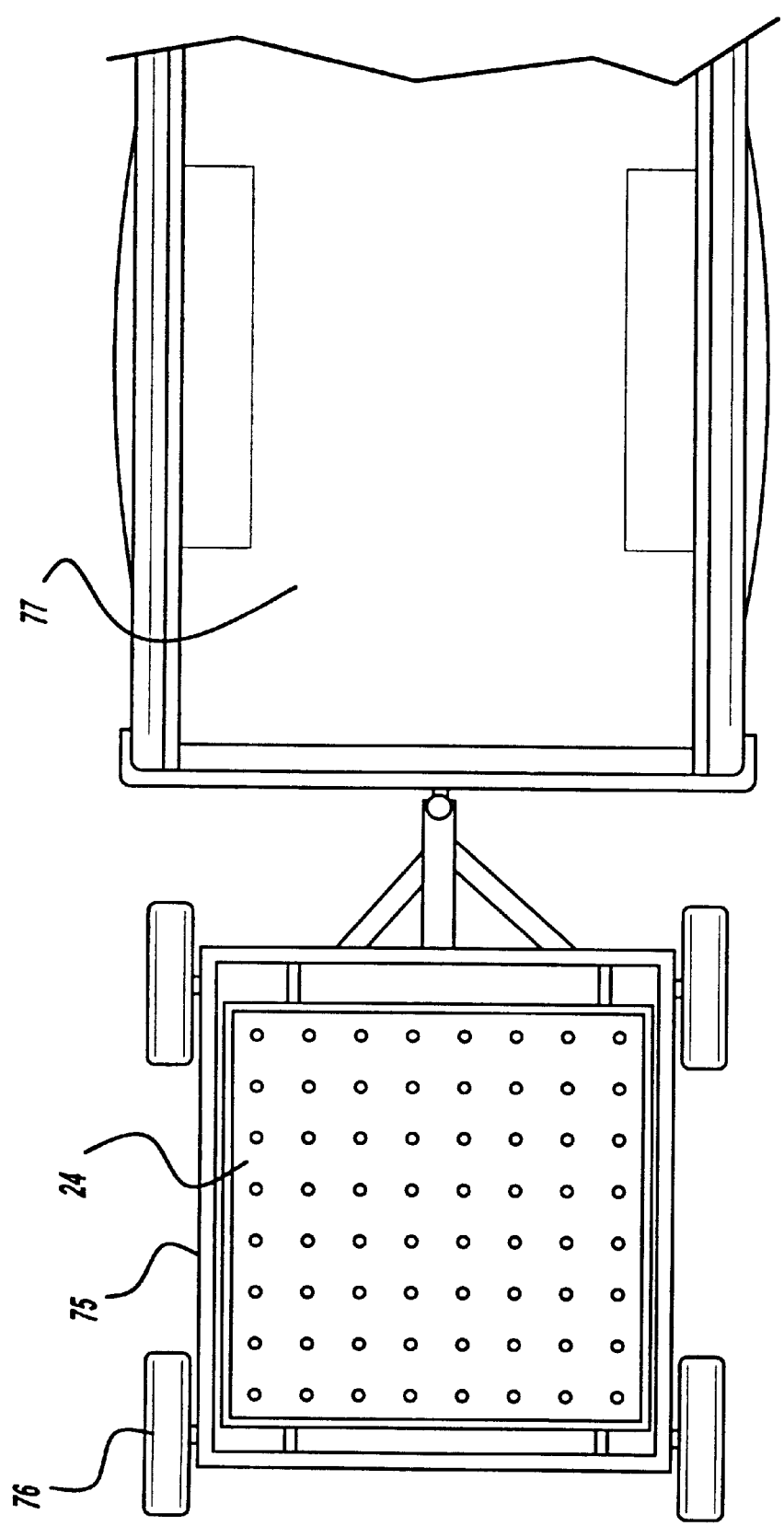
FIG. 11 is a diagrammatic view showing a fourth alternate embodiment seismic sensor array of the present invention, mounted on a frame with wheels.

FIG. 11 shows a fourth alternative embodiment of seismic sensor array 24, such as that described in the first preferred embodiment, but mounted on a frame 75 with wheels 76 in a trailer-like fashion. A flexible sheet, seismic sensors, and electronic control system, like that described for the first preferred embodiment, are attached to frame 75. Frame 75 is moved by humans, animals, or by a motorized vehicle. If moved by vehicle, frame 75 is attached to a vehicle 77 by a trailer hitch. Array 24 is movable from a substantially vertically retracted and transportable position to a substantially horizontal, measurement position in which the sensors of the array 24 are touching the ground. Array 24 in this alternative embodiment includes an actuator, and a pulley system or other linkages in the frame to allow movement of array 24 from the transportable position to the measurement position. The actuator used for the movement of the array 24 is an electric motor, hand operated mechanical device, pneumatic piston, hydraulic piston, or the like. It is additionally envisioned that the transportable position can be parallel to and raised above the measuring position without vertical pivoting.

While various embodiments have been described, it is also envisioned that a variety of other constructions can be used. Various materials have been disclosed in an exemplary fashion, however other materials may of course be employed. It is intended by the following claims to cover these and any departures from the disclosed embodiments which fall within the true spirit of this invention.

The invention claimed is:

1. A seismic sensor array comprising:

a flexible sheet of material having a periphery, the sheet being flexible when stored; and multiple seismic sensors mounted through holes on the sheet;

the periphery of the sheet being maintained in a substantially taut manner in substantially all directions during use.

2. The seismic sensor array of claim 1 further comprising:

an impulse device operably transmitting a subsonic signal;

an electronic control unit; and the array connected to the electronic control unit, the array operably sensing reflections of the signal, the electronic control unit generating a three dimensional image based at least in part on the sensed reflections.

3. The system of claim 2 further comprising an electronic network of remotely located computers connected to the electronic control unit.

4. The system of claim 2 wherein the electronic control unit includes a personal computer which produces three-dimensional imaging of seismic data that is received by the seismic sensor array.

5. The system of claim 2 wherein the array is connected to the electronic control unit in a wireless manner.

6. The system of claim 2 wherein the electronic control unit operably calculates density, pressure wave velocity and shear wave data from a sub-surface target area.

7. The system of claim 2 wherein the sheet, sensors, impulse device and control unit are all portable.

8. The seismic sensor array of claim 1 wherein the array is mechanically mountable to a vehicle during sensing.

9. The seismic sensor array of claim 8 further comprising an actuator wherein the sheet and sensors are movable together from a transportable position to a measurement position by the actuator.

10. The seismic sensor array of claim 1 wherein a substantially rigid frame is attached around substantially the entire periphery of the sheet.

11. The seismic sensor array of claim 10 further comprising a self-supporting second frame coupled to the first frame, wherein the sheet is suspended within the second frame.

12. The seismic sensor array of claim 1 further comprising a frame and wheels coupled to the frame wherein the sheet and sensors attached to the frame.

13. The seismic sensor array of claim 1 wherein the sheet and sensors are portable as a self contained unit.

14. The seismic sensor array of claim 1 wherein the sensors are at least one of the following: a two-dimensional geophone, a three-dimensional geophone, a piezo electric seismic sensor, and a hydrophone.

15. The seismic sensor array of claim 1 wherein the sheet is held on a substantially rigid frame located in a pocket in the sheet.

16. The system of claim 1 wherein each of the sensors protrude from opposing faces of the sheet of material.

17. A method of using a seismic sensor array having seismic sensors, a sheet, and an electronic control unit, the method comprising:
 (a) flexing the entire center of the sheet;
 (b) positioning the seismic sensor array on the ground;
 (c) maintaining tautness throughout the array;
 (d) transmitting a subsonic vibration into the ground;
 (e) receiving a signal from the ground by the sensors;
 (f) processing the signal with the electronic control unit; and
 (g) displaying a three-dimensional image of collected data.

18. The method of claim 17 further comprising focusing on a particular area in the ground by activating an impulse device in a plurality of locations, leaving the array in one location, collecting the sensed data from at least twenty geophones, and producing the three-dimensional image.

19. The method of claim 17 further comprising manually inserting a pointed end of each of the sensors into the ground.

20. The method of claim 17 further comprising manually inserting a substantially rigid frame into a pocket on the sheet.

21. A method of using a seismic sensor array having seismic sensors and a sheet, the method comprising:
 (a) flexing the middle of the sheet;
 (b) mounting the sensors to the sheet;
 (c) positioning the seismic sensor array on the ground.

22. The method of claim 21 further comprising:
 (a) sending a vibration into the ground;
 (b) receiving a signal from the ground by the sensors; and
 (c) processing the signal with an electronic control unit.

23. The method of claim 21 further comprising calculating a three-dimensional image of collected data sensed by the sensors.

24. The method of claim 21 further comprising rolling the sheet into a stored bundle.

* * * * *

UNITED STATES PATENT AND TRADEMARK OFFICE
CERTIFICATE OF CORRECTION

| | | |
|---|---|---|
| PATENT NO. | : 6,532,190 B2 | Page 1 of 1 |
| DATED | : March 11, 2003 | |
| INVENTOR(S) | : Ran Bachrach | |

It is certified that error appears in the above-identified patent and that said Letters Patent is hereby corrected as shown below:

<u>Column 5,</u>
Line 13, "re:" should be -- are: --.

Signed and Sealed this

Fifth Day of August, 2003

JAMES E. ROGAN
*Director of the United States Patent and Trademark Office*